(12) United States Patent
Goto et al.

(10) Patent No.: US 7,940,860 B2
(45) Date of Patent: May 10, 2011

(54) COMMUNICATION SYSTEM (75) Inventors: Michihiko Goto, Fukuoka (JP); Shinichi Fujiyoshi, Fukuoka (JP); Hidetoshi Kawamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 944 days.

(21) Appl. No.: 11/882,867

(22) Filed: Aug. 6, 2007

(65) Prior Publication Data
US 2008/0045151 A1  Feb. 21, 2008

(30) Foreign Application Priority Data
Aug. 15, 2006 (JP) .................... 2006-221347

(51) Int. Cl.
*H04L 27/00* (2006.01)
(52) U.S. Cl. ........................ 375/316; 375/259
(58) Field of Classification Search .......... 375/316, 375/259, 219; 345/80, 96, 59, 25, 209; 341/122, 341/155, 156
See application file for complete search history.

(56) References Cited

U.S. PATENT DOCUMENTS
5,438,594 A * 8/1995 Podolak ............... 375/332
5,995,465 A * 11/1999 Hayashi et al. ........ 369/47.28
7,692,615 B2 * 4/2010 Morita ................. 345/96

FOREIGN PATENT DOCUMENTS
JP   57-160239 A   10/1982
JP   58-042344 A   3/1983
JP   3-109823 A    5/1991

OTHER PUBLICATIONS

Patent Abstract of Japan, Japanese Publication No. 2002-217738, Published Aug. 2, 2002.
Patent Abstract of Japan, Japanese Publication No. 06-021989, Published Jan. 28, 1994.
"Japanese Office Action", mailed by JPO and corresponding to Japanese application No. 2006-221347 on Sep. 7, 2010, with partial English translation.

* cited by examiner

*Primary Examiner* — Khai Tran
(74) *Attorney, Agent, or Firm* — Fujitsu Patent Center (57) ABSTRACT

A communication system capable of communicating control information without decreasing the bandwidth available to users. A coder encodes a primary signal to generate encoded data such that the polarity of the encoded data alternates between positive and negative polarities. A polarity-reversed data generator reverses the polarity of part of the encoded data to generate polarity-reversed data. A transmitter transmits, as communication data, the encoded data including the polarity-reversed data. A receiver receives the communication data, and a polarity-reversed data detector determines whether or not the polarity of the received communication data alternates between positive and negative polarities, and detects, as the polarity-reversed data, data of which the polarity differs from an expected polarity. A polarity recognizer recognizes the polarity of the polarity-reversed data and treats the recognized polarity as control information.

8 Claims, 10 Drawing Sheets

| 8B DATA | 10B DATA EXPECTED VALUE (POLARITY) | 10B DATA OUTPUT VALUE (POLARITY) | CONTROL INFORMATION |
|---|---|---|---|
| 00 | 100111 0100(−) | 100111 0100(−) | |
| 01 | 100010 1011(+) | 100010 1011(+) | |
| 02 | 101101 0100(−) | 101101 0100(−) | |
| 03 | 110001 0100(+) | 001110 1011(−) | "O" |
| 04 | 110101 0100(−) | 110101 0100(−) | |
| 05 | 101001 0100(+) | 101001 0100(+) | |

| 8B DATA | 10B DATA EXPECTED VALUE (POLARITY) | 8B DATA OUTPUT VALUE (POLARITY) | |
|---|---|---|---|
| 00 | 100111 0100(−) | 100111 0100(−) | |
| 01 | 100010 1011(+) | 100010 1011(+) | |
| 02 | 101101 0100(−) | 010010 1011(+) | RESPONSE MESSAGE START TRIGGER |
| 03 | 110001 0100(+) | 001110 1011(−) | "0" (ERROR RESPONSE: NACK) |
| 04 | 110101 0100(−) | 110101 0100(−) | |
| 05 | 101001 0100(+) | 101001 0100(+) | |

COMMUNICATION SYSTEM

CROSS-REFERENCE TO RELATED APPLICATIONS

This application is based upon and claims the benefits of priority from the prior Japanese Patent Application No. 2006-221347, filed on Aug. 15, 2006, the entire contents of which are incorporated herein by reference.

BACKGROUND OF THE INVENTION

1. Field of the Invention

The present invention relates to communication systems, and more particularly, to a communication system for exchanging communication data.

2. Description of the Related Art

In conventional network systems such as Ethernet (registered trademark) systems, control information relating to control of device operations, such as alarm/fault information and device status notification information, is generally transmitted by using part of channel resources allocated to user packets.

Figure 10A:
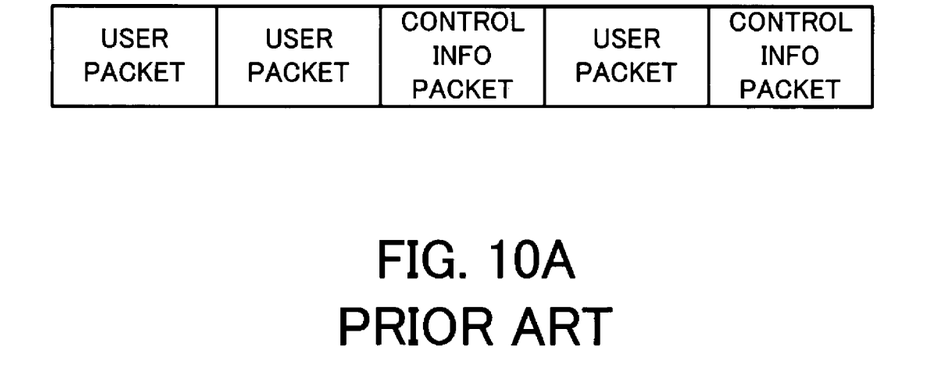
FIGS. 10A and 10B illustrate the concepts of how control information is transmitted in conventional systems.
Figure 10B:
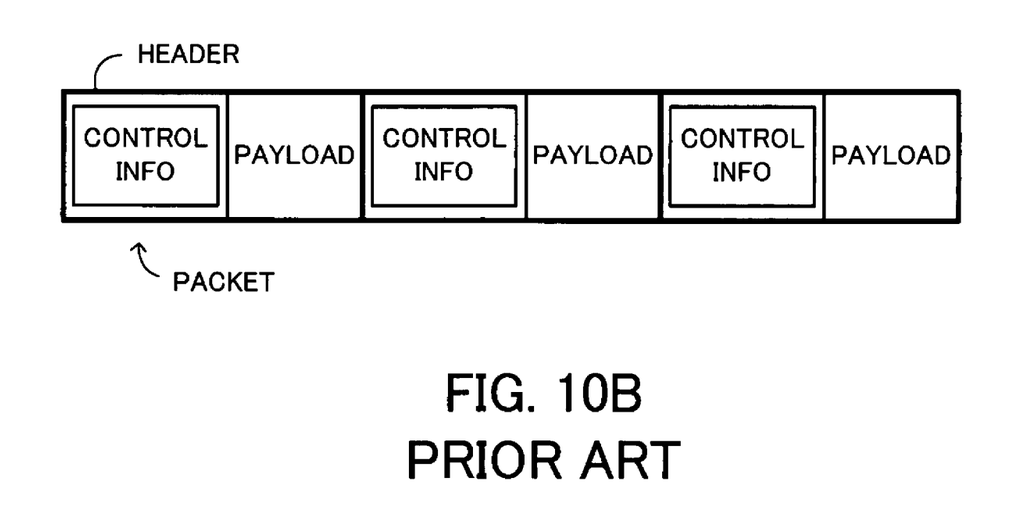

FIGS. 10A and 10B illustrate the concepts of how control information is transmitted in conventional systems. When control information is transmitted to a device within a network to control the device, the control information is assembled into a control information packet and inserted between user packets, as shown in FIG. 10A, or the control information is carried by the header of a packet, as shown in FIG. 10B.

As conventional techniques related to transmission of control information, a technique has been proposed in which control information is encoded and transmitted in such a manner that code words with neutral polarity and code words with non-neutral polarity do not exactly coincide in position (e.g., Japanese Unexamined Patent Publication No. 2002-217738 (paragraph nos. [00241] to [0029], FIG. 1)).

When control information is exchanged between devices in the conventional systems, however, part of the channel resources allocated to user packets is used to communicate the control information, as shown in FIGS. 10A and 10B, giving rise to a problem that the bandwidth available to users decreases by an amount corresponding to the control information.

SUMMARY OF THE INVENTION

The present invention was created in view of the above circumstances, and an object thereof is to provide a communication system capable of communicating control information without decreasing the bandwidth available to users.

To achieve the object, there is provided a communication system for communicating data. The communication system comprises a transmitting device and a receiving device. The transmitting device includes a coder for encoding data of a primary signal to generate encoded data such that polarity of the encoded data alternates between positive and negative polarities, a polarity-reversed data generator for reversing the polarity of part of the encoded data to generate polarity-reversed data, and a transmitter for transmitting, as communication data, the encoded data including the polarity-reversed data. The receiving device includes a receiver for receiving the communication data, a polarity-reversed data detector for determining whether or not polarity of the received communication data alternates between positive and negative polarities, and detecting, as the polarity-reversed data, data of which the polarity differs from an expected polarity, and a polarity recognizer for recognizing the polarity of the polarity-reversed data and treating the recognized polarity as control information.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
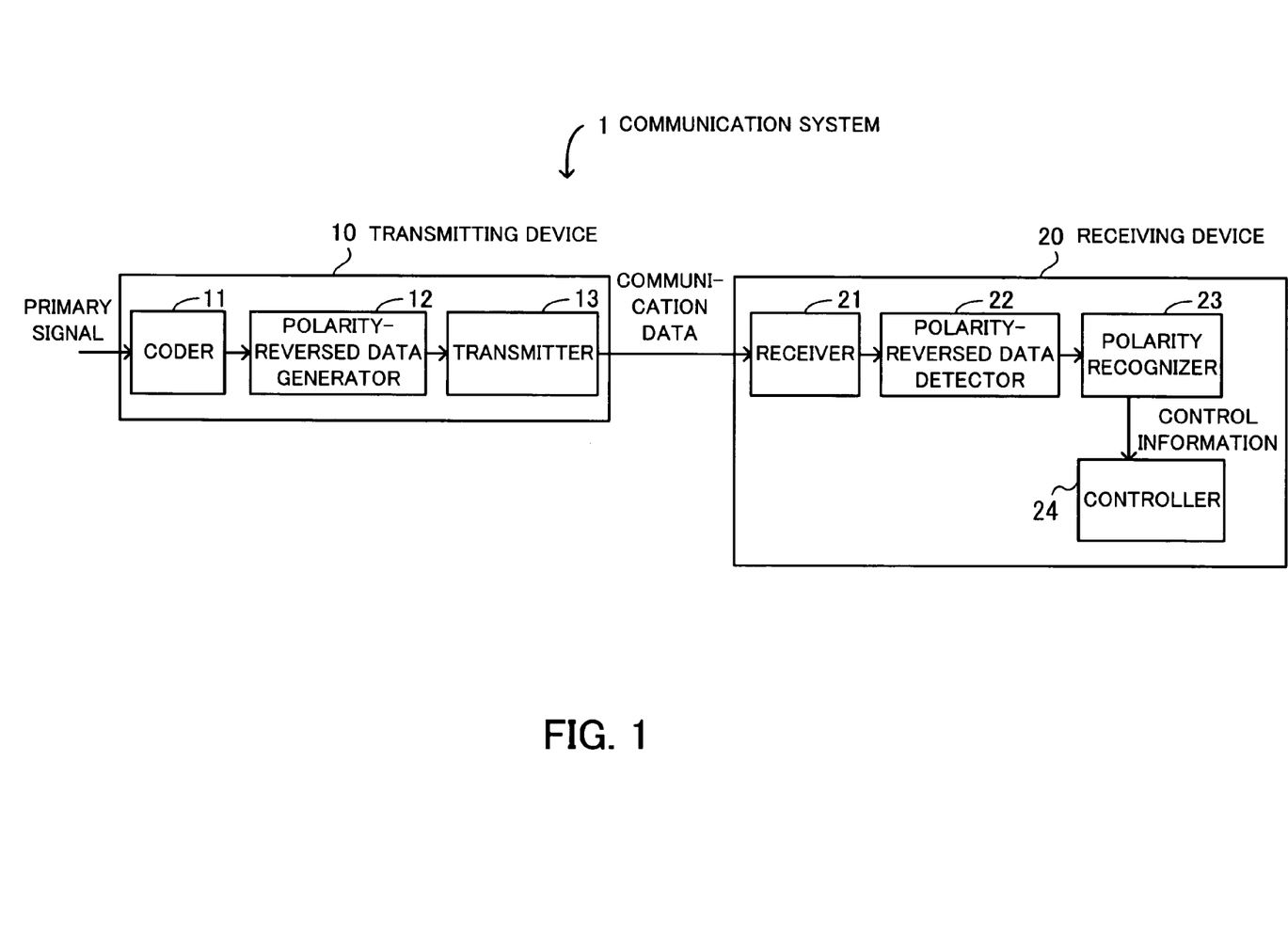
FIG. 1 illustrates the principle of a communication system.

Preferred embodiments of the present invention will be described below with reference to the accompanying drawings. FIG. 1 illustrates the principle of a communication system. The communication system 1 comprises a transmitting device 10 and a receiving device 20 and performs, for example, Ethernet communication. In the figure, the transmitting device 10 and the receiving device 20 are separately illustrated; in practice, a single communication device functions as both the transmitting and receiving devices 10 and 20.

The transmitting device 10 includes a coder 11, a polarity-reversed data generator 12, and a transmitter 13. The coder 11 encodes the data of a primary signal to generate encoded data such that the polarity of the encoded data alternates between positive and negative polarities.

The polarity-reversed data generator 12 reverses the polarity of part of the encoded data to generate polarity-reversed data. The transmitter 13 transmits, as communication data, the encoded data including the polarity-reversed data.

The receiving device 20 includes a receiver 21, a polarity-reversed data detector 22, a polarity recognizer 23, and a controller 24. The receiver 21 receives the communication data. The polarity-reversed data detector 22 determines whether or not the polarity of the received communication data alternates between positive and negative polarities, and detects, as the polarity-reversed data, data of which the polarity differs from the expected polarity. The polarity recognizer 23 recognizes the polarity of the polarity-reversed data and treats the recognized polarity as control information. The controller 24 controls the receiving device 20 in accordance with the control information.

The coder 11 generates the encoded data by converting the primary signal n bits by n bits into an m-bit data unit (n<m) whose polarity alternates between positive and negative polarities. In the following description, it is assumed that n and m are 8 and 10, respectively, so that 8B/10B conversion is performed.

The following is a brief explanation of the 8B/10B conversion. The 8B/10B conversion is an encoding scheme employed especially in Gigabit Ethernet such as 1000BASE-LX, 1000BASE-SX and 1000BASE-CX or in Fiber Channel, wherein a pattern is selected from within the 10-bit code space so that 0 s and 1 s may be almost equal in number, and 8-bit code is converted to 10-bit code for transmission and vice versa for reception.

When converting 8-bit data to 10-bit data, the balance of the 0 s and 1 s contained in the data is suitably adjusted to thereby enable recovery of the data signal with reduced bit error rate as well as recovery of the clock signal embedded in the data signal.

If, at this time, the bits 0 and 1 are simply allotted high and low signal voltages for transmission, the signal level remains unchanged in cases where there is a succession of 0 s or 1 s, possibly making the receiving side fail to achieve self-synchronization. To avoid the inconvenience, the occurrences of 0 s and 1 s are made even to adjust the direct-current balance (reduce the direct-current component), thereby preventing repetition of an identical state and enabling stable communications.

Figure 2:
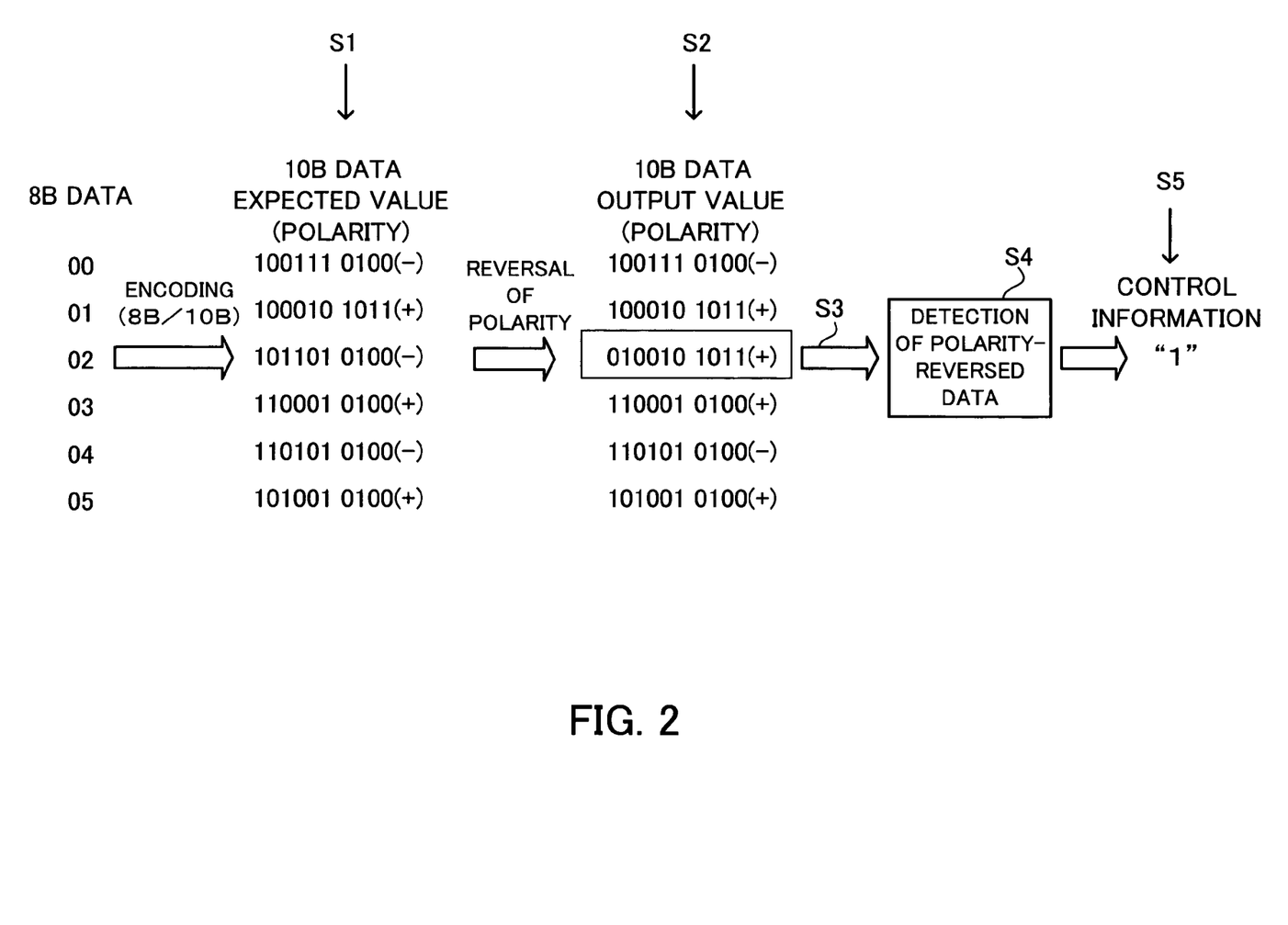
FIG. 2 illustrates operation according to a first embodiment of the invention.

The communication system 1 to which a first embodiment of the invention is applied will be now described with reference to FIG. 2 illustrating the operation of the first embodiment. Let us suppose that the transmitting device 10 transmits data 00-01-02-03-04-05 (h) as the primary signal to the receiving device 20.

S1: The coder 11 subjects the data 00-01-02-03-04-05 (h) to 8B/10B conversion (e.g., 8-bit code is converted to 10-bit code by using an 8B/10B conversion table or the like prepared beforehand).

In this instance, 00 is converted to 100111 0100 (−), 01 to 100010 1011 (+), 02 to 101101 0100 (−), 03 to 110001 0100 (+), 04 to 110101 0100 (−), and 05 to 101001 0100 (+). Each sign enclosed in parentheses indicates the polarity of data. The conversion is carried out such that the polarity begins with negative polarity (−) as an initial value and thereafter alternates between positive (+) and negative (−) polarities.

S2: The polarity-reversed data generator 12 reverses the polarity of part of the encoded data. In FIG. 2, the polarity of 101101 0100 (−), which is the 10B data of 02, is reversed, thus obtaining 010010 1011 (+).

S3: The transmitter 13 transmits communication data including the polarity-reversed data 010010 1011 (+), and the receiver 21 receives the communication data.

S4: The polarity-reversed data detector 22 determines whether or not the polarity of the received communication data alternates between positive and negative polarities, and detects, as the polarity-reversed data, data of which the polarity differs from the expected polarity.

In this instance, the communication data is received in the order: 100111 0100 (−)→100010 1011 (+) →010010 1011 (+)→110001 0100 (+)→110101 0100 (−)→101001 0100 (+). The third data 010010 1011 (+), which is the 10B data of 02, has polarity different from the expected polarity, and therefore, this data is detected as the polarity-reversed data.

S5: The polarity recognizer 23 determines whether the polarity of the polarity-reversed data is reversed in the positive-to-negative direction or vice versa, and treats 1-bit information indicated by the determined reversal direction as control information for the receiving device 20.

For example, if data with the polarity (+) is input at the timing when the polarity (−) is expected, this polarity reversal direction is recognized as the control information "1". On the other hand, if data with the polarity (−) is input at the timing when the polarity (+) is expected, the polarity reversal direction is recognized as the control information "0". In the example of FIG. 2, data with the polarity (+) is received at the timing when the polarity (−) is expected, and therefore, the control information "1" is derived.

Figure 3:
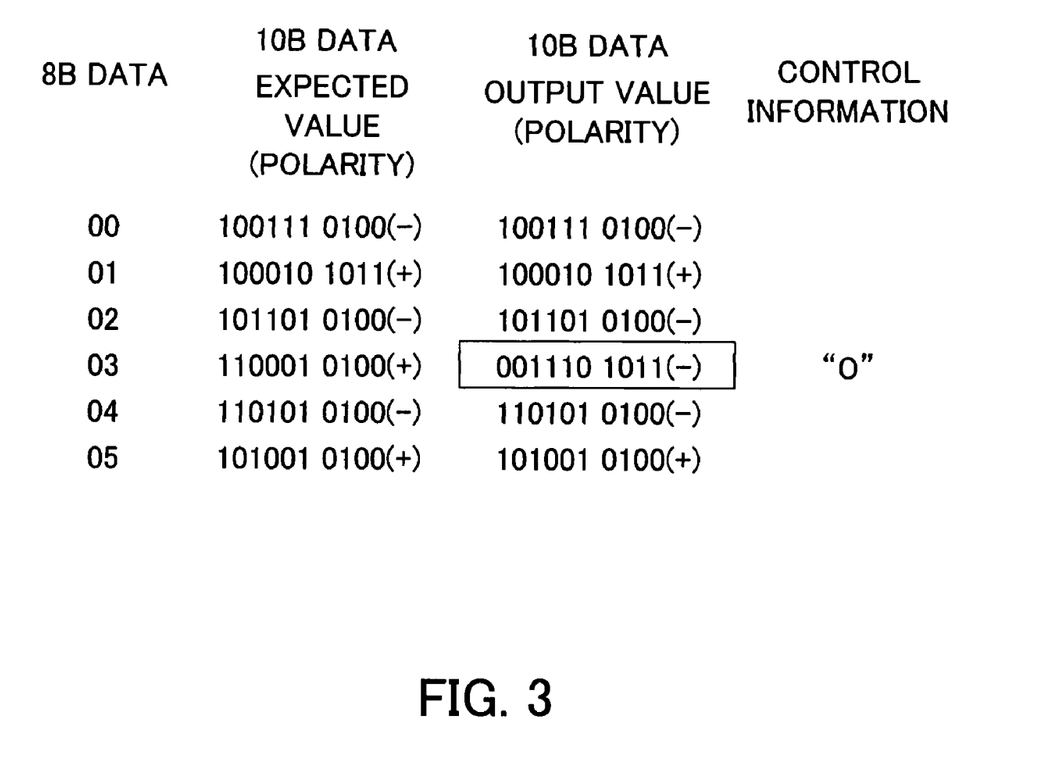
FIG. 3 shows an example of polarity reversal from positive to negative polarity.

FIG. 3 shows an example of polarity reversal from the positive to negative polarity. In the figure, the polarity of the data 110001 0100 (+), which is the 10B data of 03, is reversed, thus obtaining 001110 1011 (−) As a result, the control information "0" is derived.

In the example shown in FIG. 2, "1" is obtained as the control information, and the controller 24 performs a predetermined control action in accordance with the control information "1". For example, prearrangement is made such that the control information "1" indicates a notification of fault occurrence, and when the control information "1" is received from the transmitting device 10, the controller 24 executes an appropriate process to cope with the fault occurring in the transmitting side.

Thus, in the first embodiment, the polarity of data is reversed so that the polarity-reversed data may be used as the control information. It is therefore unnecessary to insert control information in user channel resources, and the control information can be transmitted as a polarity change of the primary signal. Accordingly, the bandwidth available to users does not decrease at all and yet the control information can be transferred between the transmitting and receiving devices, making it possible to improve communication quality.

After the control information is derived from the polarity reversal direction of the polarity-reversed data, the receiving device 20 again reverses the polarity of the polarity-reversed data to recover the original data, that is, the data 010010 1011 (+) is reversed in polarity as 101101 0100 (−), so that the data 101101 0100 (−) corresponding to 02 may be used as user data. The receiving device 20 then performs 10B/8B conversion, thus obtaining 00-01-02-03-04-05 (h).

The communication system 1 to which a second embodiment of the invention is applied will be now described. In the second embodiment, the first polarity-reversed data is recognized as a control information start trigger, and the polarities of the succeeding k (=1, 2, . . . ) units of 10B data are treated as the control information.

Figure 4:
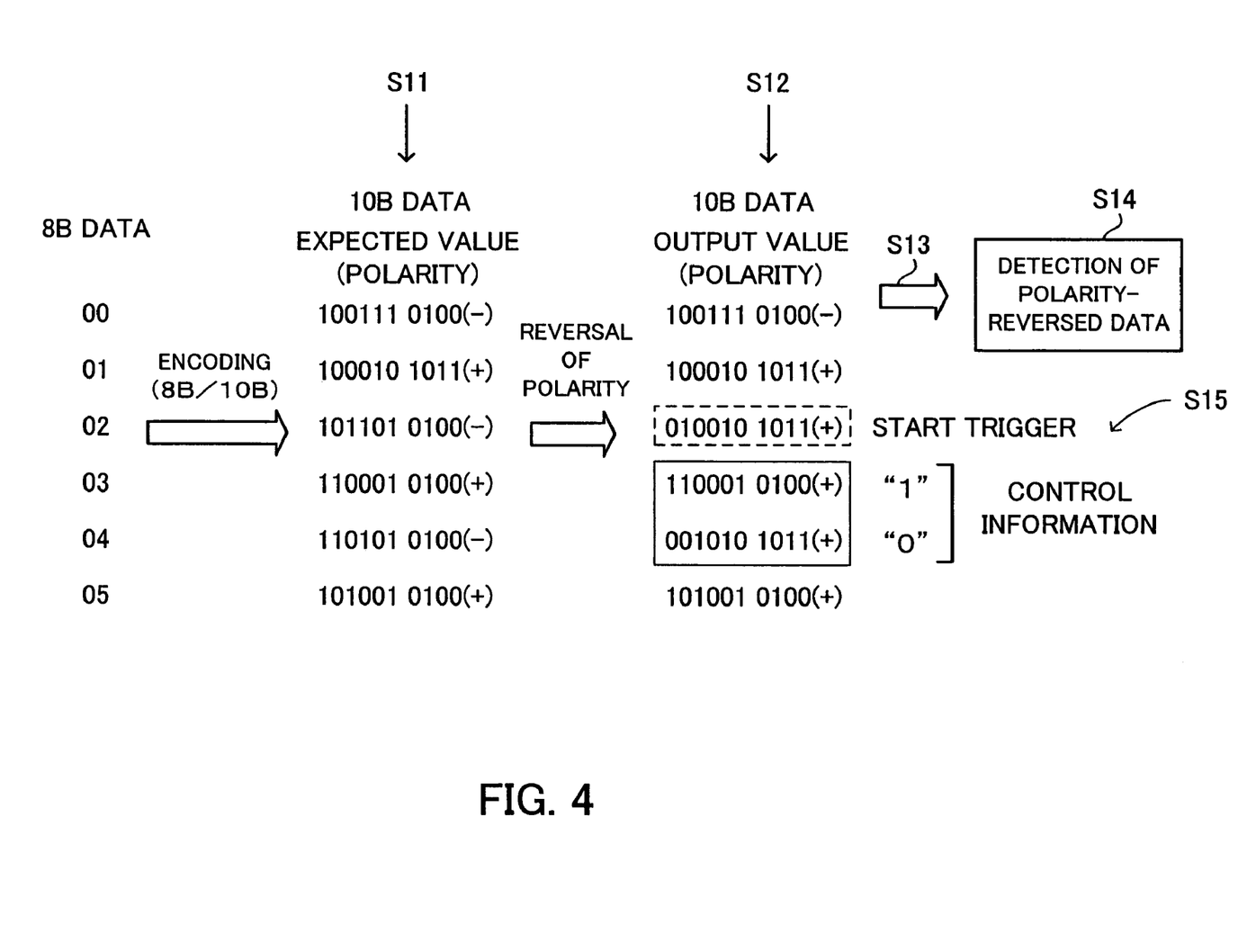
FIG. 4 illustrates operation according to a second embodiment.

FIG. 4 illustrates operation according to the second embodiment. It is assumed here that the transmitting device 10 transmits data 00-01-02-03-04-05 (h) as the primary signal to the receiving device 20.

S11: The coder 11 subjects the data 00-01-02-03-04-05 (h) to 8B/10B conversion, so that 00 is converted to 100111 0100 (−), 01 to 100010 1011 (+), 02 to 101101 0100 (−), 03 to 110001 0100 (+), 04 to 110101 0100 (−), and 05 to 101001 0100 (+). The conversion is carried out such that the polarity begins with negative polarity (−) as an initial value and thereafter alternates between positive (+) and negative (−) polarities.

S12: The polarity-reversed data generator 12 generates polarity-reversed data by reversing the polarity of at least one unit of 10B data. In FIG. 4, the polarity of 101101 0100 (−), which is the 10B data of 02, is reversed, thus obtaining 010010 1011 (+). Further, the polarity of 110101 0100 (−), which is the 10B data of 04, is reversed, thus obtaining 001010 1011 (+).

S13: The transmitter 13 transmits communication data including the polarity-reversed data 010010 1011 (+) and 001010 1011 (+), and the receiver 21 receives the communication data.

S14: The polarity-reversed data detector 22 determines whether or not the polarity of the received communication data alternates between positive and negative polarities, and detects, as the polarity-reversed data, data of which the polarity differs from the expected polarity.

In this instance, the communication data is received in the order: 100111 0100 (−)→100010 1011 (+) →010010 1011 (+)→110001 0100 (+)→001010 1011 (+)→101001 0100 (+). The third data 010010 1011 (+), which is the 10B data of 02, and the fifth data 001010 1011 (+), which is the 10B data of 04, have polarity different from their expected polarity, and therefore, these two units of data are detected as the polarity-reversed data.

S15: The polarity recognizer 23 recognizes the first detected polarity-reversed data as the control information start trigger and treats the polarities of the succeeding k units of 10B data as the control information. The value of k is determined beforehand.

Where k=2, for example, the first polarity-reversed data 010010 1011 (+) corresponding to 02 is recognized as the control information start trigger, and the polarities of the two units of 10B data (20(=2×10) bits in total) succeeding 02 and corresponding to 03 and 04, respectively, are treated as the control information.

Assuming that the polarity identical with the expected polarity indicates "1" and that the polarity different from the expected polarity indicates "0", the polarities of the two units of 10B data corresponding to 03 and 04 show "10" as the control information. In accordance with the control information "10", the controller 24 performs a predetermined control action.

With reference to the aforementioned Step S12, it is stated that "the polarity-reversed data is generated by reversing the polarity of at least one unit of data." The expression "at least one unit of data" is used because the polarity of one unit of 10B data needs to be reversed so as to indicate the control information start trigger and also because it is likely that the polarities of the succeeding units of data happen to agree with the contents of the control information to be communicated and thus need not be reversed.

Thus, in the second embodiment, the first detected polarity-reversed data is recognized as the control information start trigger, and the polarities of the k units of 10B data succeeding the polarity-reversed data are treated as the control information. With this configuration, the amount of the control information can be increased.

The communication system 1 to which a third embodiment of the invention is applied will be now described. In the third embodiment, the same process as in the second embodiment is executed, and in addition, an error-correcting code (e.g., parity check code) is added at the end of the control information to check normalcy of data transmission.

Figure 5:
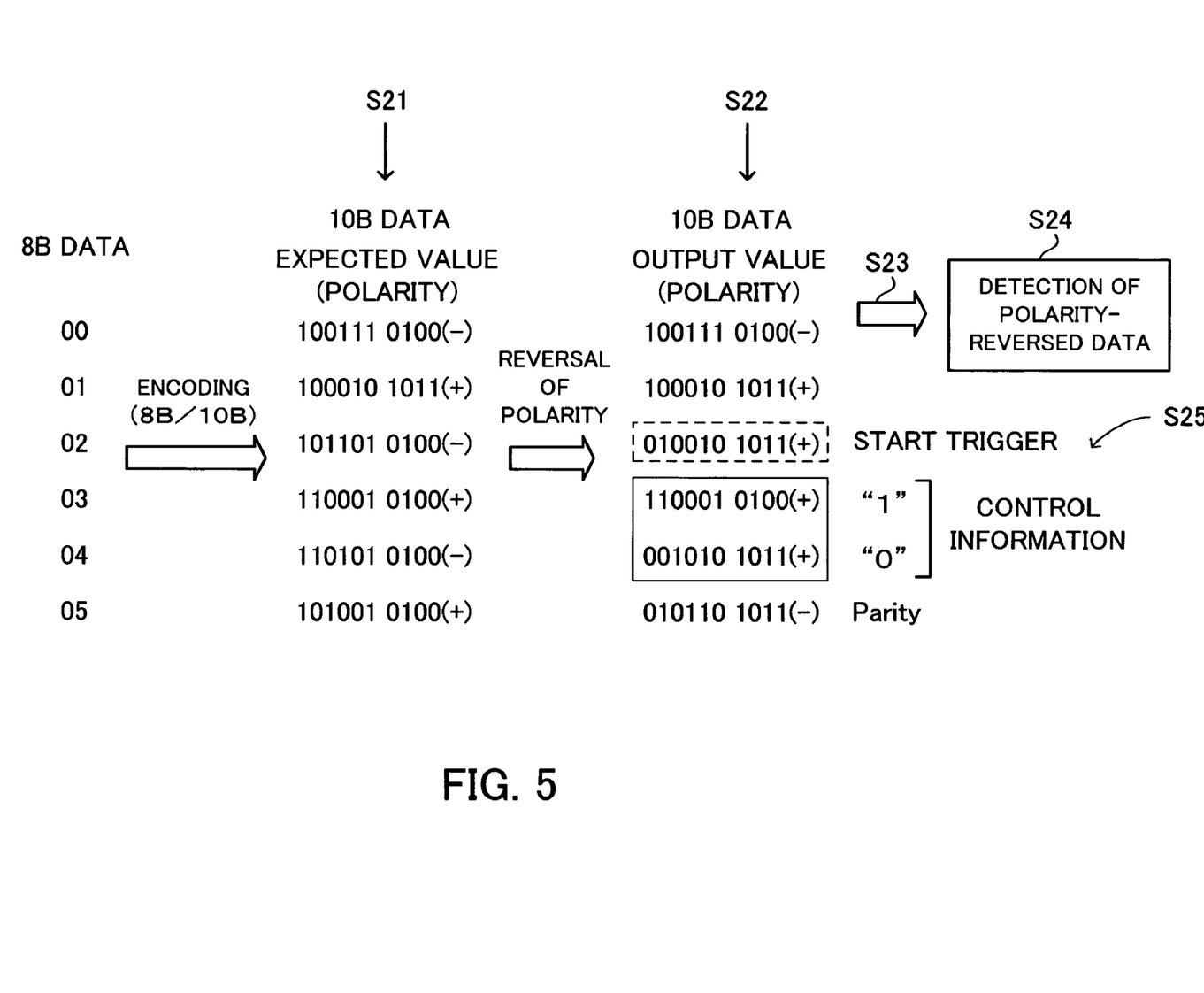
FIG. 5 illustrates operation according to a third embodiment.

FIG. 5 illustrates operation according to the third embodiment. It is assumed here that the transmitting device 10 transmits data 00-01-02-03-04-05 (h) as the primary signal to the receiving device 20.

S21: The coder 11 subjects the data 00-01-02-03-04-05 (h) to 8B/10B conversion, so that 00 is converted to 100111 0100 (−), 01 to 100010 1011 (+), 02 to 101101 0100 (−), 03 to 110001 0100 (+), 04 to 110101 0100 (−), and 05 to 101001 0100 (+). The conversion is performed such that the polarity begins with negative polarity (−) as an initial value and thereafter alternates between positive (+) and negative (−) polarities.

S22: The polarity-reversed data generator 12 generates polarity-reversed data by reversing the polarity of at least two units of 10B data. In FIG. 5, the polarity of 101101 0100 (−), which is the 10B data of 02, is reversed, thus obtaining 010010 1011 (+), and the polarity of 110101 0100 (−), which is the 10B data of 04, is reversed, thus obtaining 001010 1011 (+). Further, the polarity of 101001 0100 (+), which is the 10B data of 05, is reversed, thus obtaining 010110 1011 (−). The polarity-reversed data corresponding to 02 indicates the control information start trigger, while the polarity-reversed data corresponding to 05 is used as error-correcting code data.

S23: The transmitter 13 transmits communication data including the polarity-reversed data generated in Step S22, and the receiver 21 receives the communication data.

S24: The polarity-reversed data detector 22 determines whether or not the polarity of the received communication data alternates between positive and negative polarities, and detects, as the polarity-reversed data, data of which the polarity differs from the expected polarity.

In this instance, the communication data is received in the order: 100111 0100 (−)→100010 1011 (+) →010010 1011 (+)→110001 0100 (+)→001010 1011 (+)→010110 1011 (−). The third data 010010 1011 (+), which is the 10B data of 02, the fifth data 001010 1011 (+), which is the 10B data of 04, and the sixth data 010110 1011 (−), which is the 10B data of 05, have polarities different from their respective expected polarities, and therefore, these three units of data are detected as the polarity-reversed data.

S25: The polarity recognizer 23 recognizes the first detected polarity-reversed data as the control information start trigger and treats the polarities of the succeeding k (=1, 2, . . . ) units of 10-bit data as the control information. The value of k is determined in advance.

Where k=2, for example, the first polarity-reversed data 010010 1011 (+) corresponding to 02 is recognized as the control information start trigger, and the polarities of the two units of 10B data (20(=2×10) bits in total) succeeding 02 and corresponding to 03 and 04, respectively, are treated as the control information.

Assuming that the polarity identical with the expected polarity indicates "1" and that the polarity different from the expected polarity indicates "0", the polarities of the two units of 10B data corresponding to 03 and 04 show "10" as the control information. In accordance with the control information "10", the controller 24 performs a predetermined control action.

Further, the polarity recognizer 23 recognizes the (k+1)th data, that is, the polarity-reversed data 010110 1011 (−) which is the third data following the start trigger and corresponding to 05, as the error-correcting code data and checks normalcy of the transmission line by means of this code.

For example, odd parity check is adopted (in which the transmitting side transmits data with the sum of 1 s set to an odd number, and the receiving side judges the transmission line to be normal if the sum of 1 s in the received data is odd, and judges the transmission line to be anomalous if the sum of 1 s is even). In the example shown in FIG. 5, the sum of 1 s in the data 010110 1011 (−) corresponding to 05 is "6", and therefore, the transmission line is judged to be anomalous. In this case, the control information "10" and the 10B data forming the primary signal are regarded as invalid.

With reference to the aforementioned Step S22, it is stated that "the polarity-reversed data is generated by reversing the polarity of at least two units of data." The expression "at least two units of data" is used because the polarity of two units of 10B data needs to be reversed, one to indicate the control information start trigger and the other to include the error-correcting code, and also because it is likely that the polarities of the intervening units of data happen to agree with the contents of the control information to be communicated and thus need not be reversed.

In this manner, the third embodiment is configured to perform the function of the second embodiment, and besides, the error-correcting code such as a parity check code is included in the communication data to be transmitted. This permits the receiving device 20 to correct error in the control information, making it possible to prevent erroneous transmission of the control information.

The communication system 1 to which a fourth embodiment of the invention is applied will be now described. In the fourth embodiment, a response message indicative of reception of data is transmitted by using the polarity of communication data.

Figure 6:
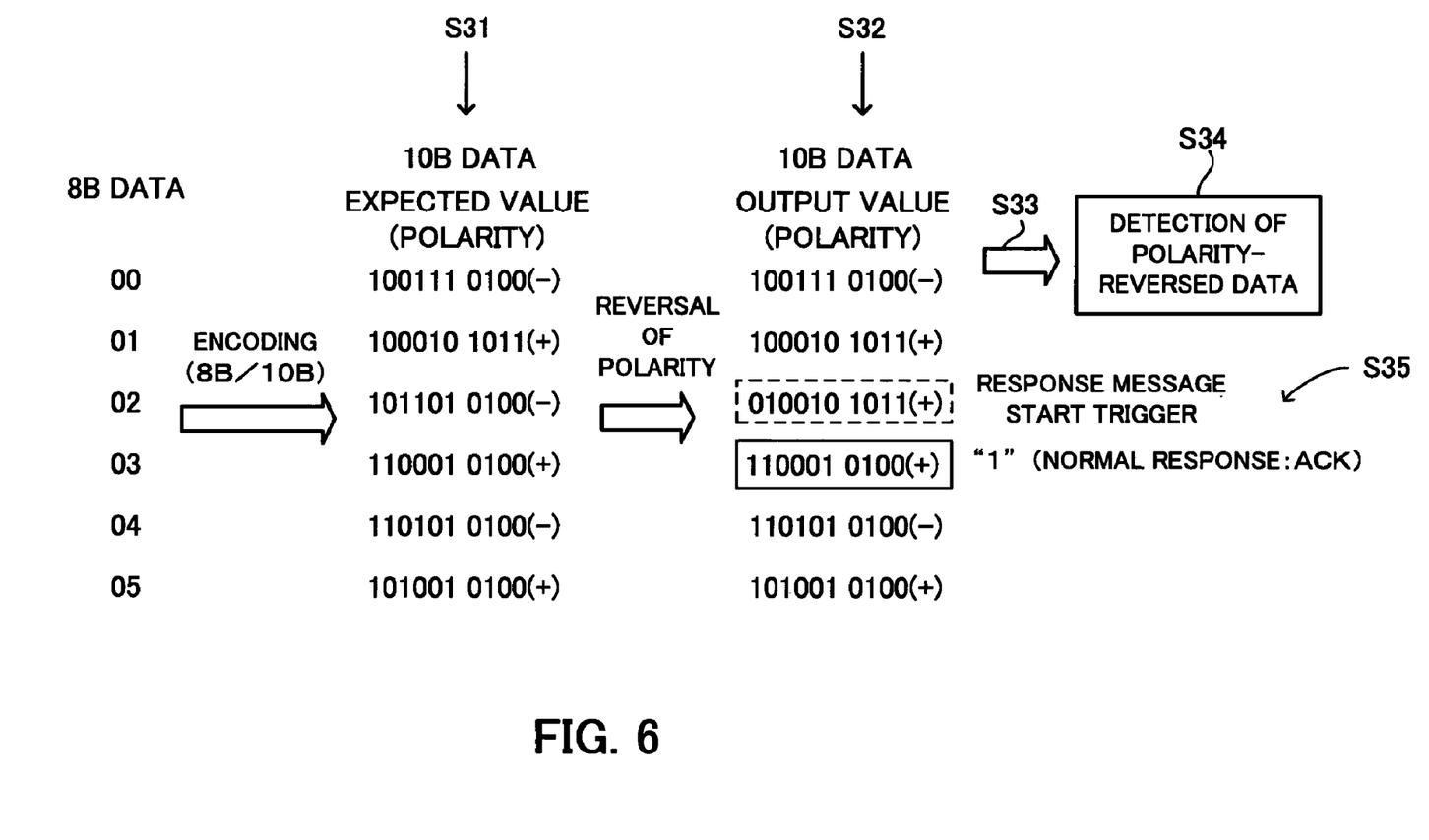
FIG. 6 illustrates operation according to a fourth embodiment.

FIG. 6 illustrates operation according to the fourth embodiment. Let us consider the case where certain data has been sent from the receiving device 20 to the transmitting device 10, and in response to the data received, the transmitting device 10 transmits a response message, together with a primary signal 00-01-02-03-04-05 (h), to the receiving device 20 by making use of the polarity of the primary signal.

S31: The coder 11 subjects the data 00-01-02-03-04-05 (h) to 8B/10B conversion, so that 00 is converted to 100111 0100 (−), 01 to 100010 1011 (+), 02 to 101101 0100 (−), 03 to 110001 0100 (+), 04 to 110101 0100 (−), and 05 to 101001 0100 (+). The conversion is carried out such that the polarity begins with negative polarity (−) as an initial value and thereafter alternates between positive (+) and negative (−) polarities.

S32: To send a response message to the receiving device 20 in reply to the data received therefrom, the polarity-reversed data generator 12 generates polarity-reversed data by reversing the polarity of one unit of 10B data to indicate a response message start trigger, which is the start position of the response message.

Then, the polarity of the 10B data unit immediately following the response message start trigger is left unreversed if a normal response message (ACK) is to be transmitted, and is reversed if an error response message (NACK) is to be transmitted.

In the illustrated example, the polarity of 101101 0100 (−), which is the 10B data of 02, is reversed as the response message start trigger, thus obtaining 010010 1011 (+). Assuming that a normal response message (ACK) is to be transmitted, the polarity of the 10B data corresponding to 03 is left unreversed.

S33: The transmitter 13 transmits the communication data processed in Step S32, and the receiver 21 receives the communication data.

S34: The polarity-reversed data detector 22 determines whether or not the polarity of the received communication data alternates between positive and negative polarities, and detects, as the polarity-reversed data, data of which the polarity differs from the expected polarity.

In this instance, the communication data is received in the order: 100111 0100 (−)→100010 1011 (+) →010010 1011 (+)→110001 0100 (+)→110101 0100 (−)→101001 0100 (+). The third data 010010 1011 (+) has polarity different from the expected polarity, and therefore, this data is detected as the polarity-reversed data.

S35: The polarity recognizer 23 recognizes the first detected polarity-reversed data as the response message start trigger and determines whether the polarity of the 10B data immediately following the polarity-reversed data shows a normal response indicative of normal transmission of data or an error response indicative of transmission error.

Assuming that the polarity identical with the expected polarity indicates control information "1" as the normal response and that the polarity different from the expected polarity indicates control information "0" as the error response, the polarity of the 10B data 110001 0100 (+) immediately following the first detected polarity-reversed data and corresponding to 03 shows the control information "1" since it is identical with the expected polarity. Based on the control information "1", therefore, it is concluded that the data was normally transmitted.

Figure 7:
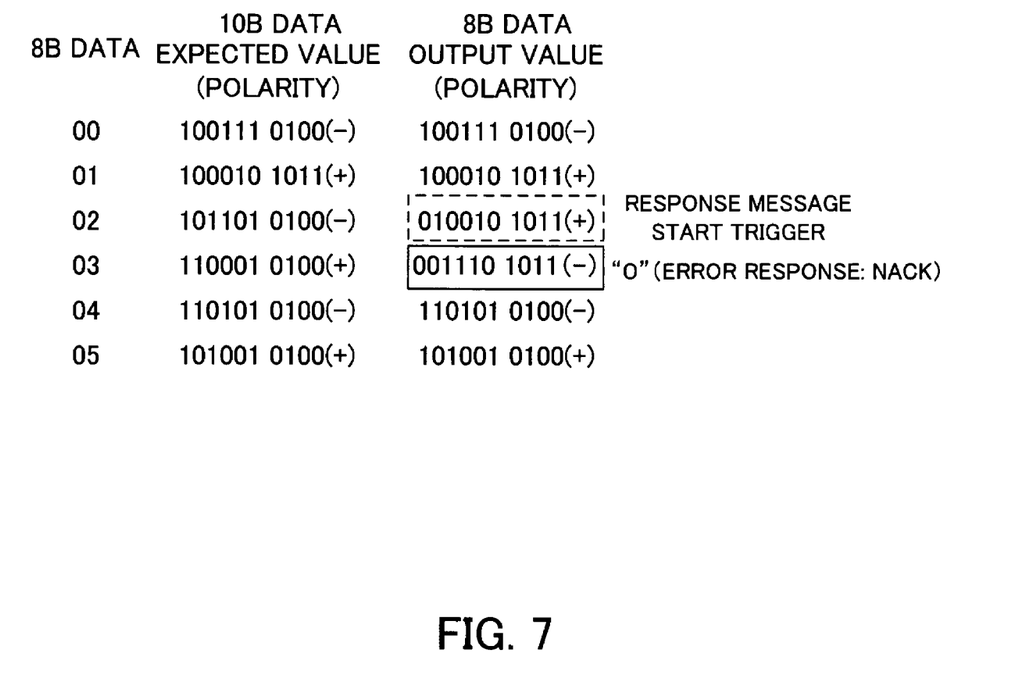
FIG. 7 shows a case where an error response has been received.

FIG. 7 shows the case where an error response has been received. The 10B data corresponding to 03 is 001110 1011 (−), that is, the polarity of the 10B data has been reversed and differs from the expected polarity. Accordingly, the control information "0" indicative of error response is derived.

Thus, in the fourth embodiment, the polarity of the primary signal is utilized to transmit the response message start trigger, which indicates the start of a response message responsive to the data received, as well as the ACK or NACK message. It is therefore possible to determine whether or not data has been normally transmitted. For example, normalcy of data transmission may be determined based on the parity check code used in the third embodiment, and a response message indicating the determination result may be transmitted by using the function of the fourth embodiment.

Figure 8:
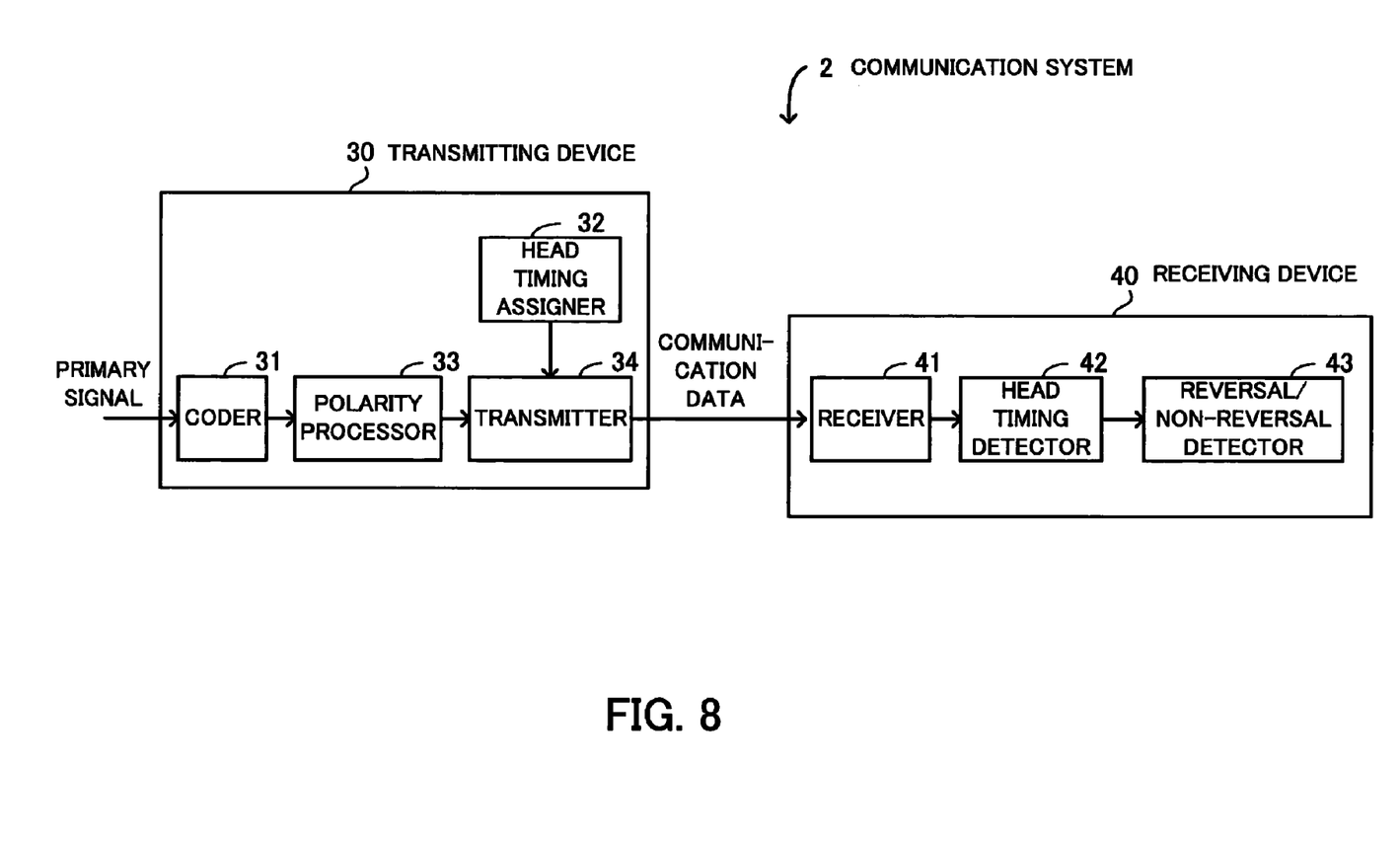
FIG. 8 illustrates the principle of a communication system.

A modification of the communication system 1 will be now described with reference to FIG. 8 illustrating the principle thereof. A communication system 2 comprises a transmitting device 30 and a receiving device 40. The transmitting device 30 includes a coder 31, a head timing assigner 32, a polarity processor 33, and a transmitter 34.

The coder 31 encodes the data of a primary signal to generate encoded data such that the polarity of the encoded data alternates between positive and negative polarities. The head timing assigner 32 assigns, to the encoded data, head timing indicative of the head, or beginning, of the encoded data.

With respect to k units of data succeeding the head timing, the polarity processor 33 performs a process such that the polarities of the k data units are individually reversed or left unreversed. The transmitter 34 transmits, as communication data, the encoded data to which the head timing has been assigned and of which the polarity has been processed by the polarity processor 33.

The receiving device 40 includes a receiver 41, a head timing detector 42, and a polarity reversal/non-reversal detector 43. The receiver 41 receives the communication data, and the head timing detector 42 detects the head timing from the communication data.

The polarity reversal/non-reversal detector 43 determines whether or not the polarities of the k data units succeeding the head timing alternate between positive and negative polarities. Then, the polarity different from the expected polarity is detected as a polarity reversal value while the polarity identical with the expected polarity is detected as a polarity non-reversal value, and polarity data constituted by at least one of the polarity reversal and non-reversal values is treated as control information.

Figure 9:
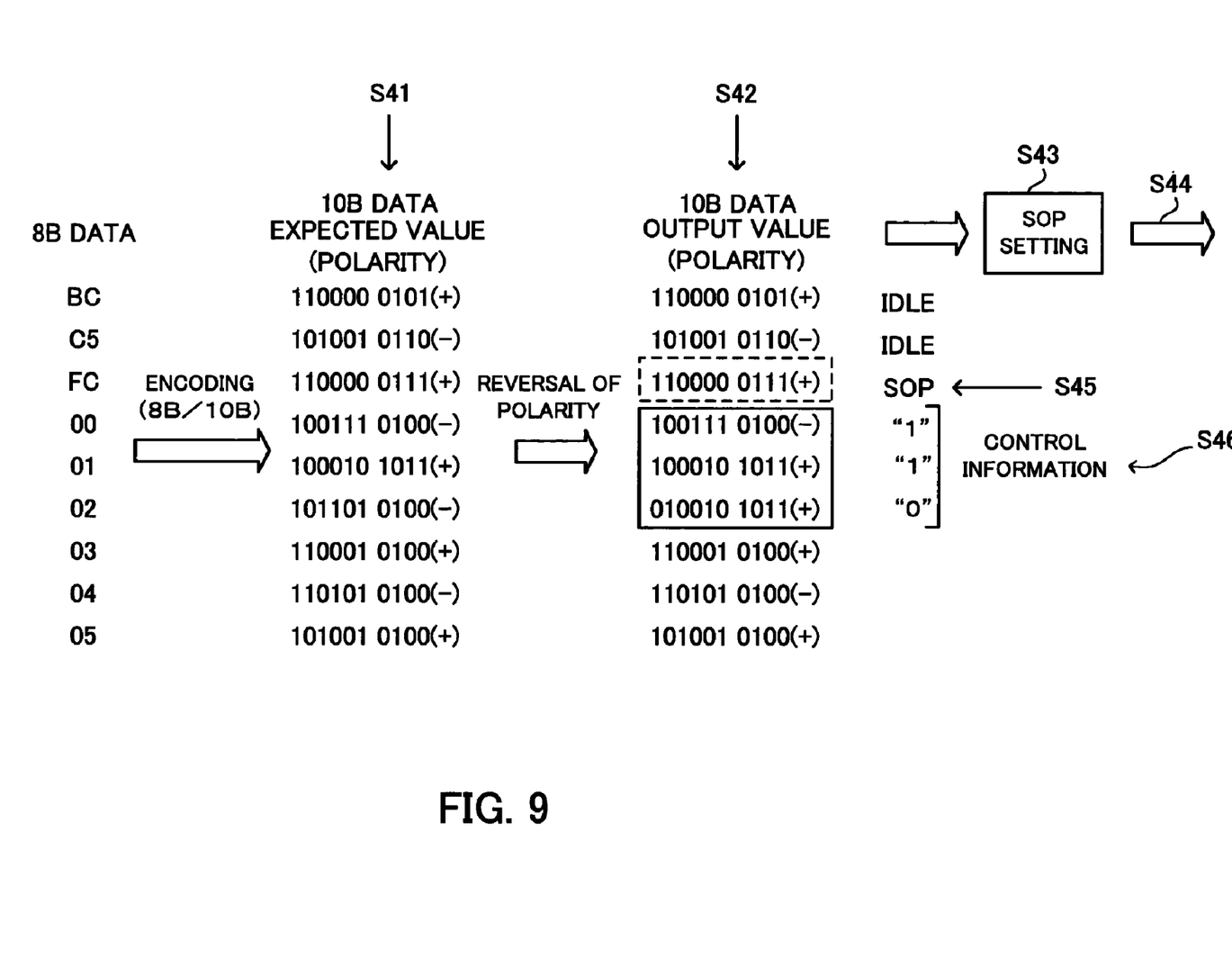
FIG. 9 illustrates operation of the communication system.

Operation of the communication system 2 will be now explained with reference to FIG. 9. It is assumed here that the transmitting device 30 transmits data 00-01-02-03-04-05 (h) as the primary signal to the receiving device 40. Also, the transmitting device 30 transmits BC and C5 as inter-packet gap data (idle) and FC as SOP (Start Of Packet) indicating the start of a packet.

S41: The coder 31 subjects the data 00-01-02-03-04-05 (h) to 8B/10B conversion, so that 00 is converted to 100111 0100 (−), 01 to 100010 1011 (+), 02 to 101101 0100 (−), 03 to 110001 0100 (+), 04 to 110101 0100 (−), and 05 to 101001 0100 (+). The conversion is carried out such that the polarity begins with negative polarity (−) as an initial value and thereafter alternates between positive (+) and negative (−) polarities.

S42: With respect to the k units of data succeeding the head timing, the polarity processor 33 performs a process such that the polarities of the k data units are individually reversed or left unreversed. In FIG. 9, the polarity of 101101 0100 (−), which is the 10B data of 02, is reversed, thus obtaining 010010 1011 (+).

S43: The head timing assigner 32 generates 110000 0111 (+), which is 10B data corresponding to FC, as SOP indicating the start of a packet.

S44: The transmitter 34 transmits 110000 0101 (+), which is 10B data corresponding to BC, and 101001 0110 (−), which is 10B data corresponding to C5, in the intervals where no packet data exists. Also, the transmitter attaches 110000 0111 (+), which is 10B data corresponding to FC and serving as the SOP indicating the start of packet data, to the encoded data and transmits, as communication data, the encoded data whose polarity has been processed by the polarity processor 33. The receiver 41 receives the communication data.

S45: The head timing detector 42 detects the SOP.

S46: The polarity reversal/non-reversal detector 43 determines whether or not the polarity of the received packet data alternates between positive and negative polarities, and treats the polarities of the k units of 10B data succeeding the SOP as the control information. The value of k is determined beforehand.

Where k=3, for example, the polarities of the three units of 10B data (30(=3×10) bits in total) succeeding the SOP and corresponding to 00, 01 and 02 are treated as the control information.

The polarity identical with the expected polarity may be recognized as the polarity non-reversal value "1" while the polarity different from the expected polarity may be recognized as the polarity reversal value "0", and in this case, the polarities of the three units of 10B data corresponding to 00, 01 and 02 show the control information "110".

Thus, the communication system 2 detects the SOP not only as the packet start trigger but as the control information start trigger and treats the polarities of the k units of 10B data succeeding the SOP as the control information.

In the case of assembling the encoded data into packets with this configuration, it is possible, for example, to cause the head timing assigner 32 to assign the head timing to each of packets p1, p2, . . . , and to cause the polarity processor 33 to include, in the different packets p1, p2, . . . , control information c1, c2, . . . corresponding thereto.

In this case, packets may be generated such that the polarities of the three units of 10B data succeeding the head timing of the packet p1 indicate the control information while the polarities of the four units of 10B data succeeding the head timing of the packet p2 indicate the control information, to thereby enable the polarity reversal/non-reversal detector 43 of the receiving device 40 to acquire different polarity data on the packets p1, p2, . . . as their control information.

In the communication system of the present invention, the transmitting device encodes the primary signal to generate encoded data such that the polarity of the encoded data alternates between positive and negative polarities, and reverses the polarity of part of the encoded data to generate polarity-reversed data. At the receiving device, it is determined whether or not the polarity of received communication data alternates between positive and negative polarities, data having polarity different from the expected polarity is detected as the polarity-reversed data, and the polarity of the polarity-reversed data is treated as control information. Thus, since the control information can be communicated between the transmitting and receiving devices without decreasing the bandwidth available to users, all channel resources can be devoted to user data, making it possible to improve communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for communicating data, comprising:
   a transmitting device including a coder for encoding data of a primary signal to generate encoded data such that polarity of the encoded data alternates between positive and negative polarities, a polarity-reversed data generator for reversing the polarity of part of the encoded data to generate polarity-reversed data, and a transmitter for transmitting, as communication data, the encoded data including the polarity-reversed data; and
   a receiving device including a receiver for receiving the communication data, a polarity-reversed data detector for determining whether or not polarity of the received communication data alternates between positive and negative polarities, and detecting, as the polarity-reversed data, data of which the polarity differs from an expected polarity, and a polarity recognizer for recognizing the polarity of the polarity-reversed data and treating the recognized polarity as control information.

2. The communication system according to claim 1, wherein the coder generates the encoded data by converting the primary signal n bits by n bits into an m-bit data unit (n<m) whose polarity alternates between positive and negative polarities.

3. The communication system according to claim 2, wherein the polarity-reversed data generator generates the polarity-reversed data by reversing the polarity of one of the m-bit data units constituting the encoded data, and
   the polarity recognizer determines whether the polarity of the polarity-reversed data is reversed in a positive-to-negative direction or a negative-to-positive direction, and treats 1-bit information indicated by the determined reversal direction as the control information for the receiving device.

4. The communication system according to claim 2, wherein the polarity-reversed data generator generates the polarity-reversed data by reversing the polarity of at least one of the m-bit data units constituting the encoded data, and
   the polarity recognizer recognizes, as a start trigger of the control information, the polarity-reversed data that is detected first in the received communication data, and treats polarities of k m-bit data units succeeding a first detected polarity-reversed data as the control information.

5. The communication system according to claim 2, wherein the polarity-reversed data generator generates the polarity-reversed data by reversing the polarities of at least two of the m-bit data units constituting the encoded data, and
   the polarity recognizer recognizes, as a start trigger of the control information, the polarity-reversed data that is detected first in the received communication data, treats the polarities of k m-bit data units succeeding the first detected polarity-reversed data as the control information, recognizes (k+1)th polarity-reversed data as error-correcting code data, and checks normalcy of transmission line based on the error-correcting code data.

6. The communication system according to claim 2, wherein, when the transmitting device transmits a response message to the receiving device in response to data received from the receiving device, the polarity-reversed data generator generates the polarity-reversed data by reversing the polarity of one of the m-bit data units so as to indicate a start position of the response message, allows the polarity of the m-bit data unit immediately succeeding the start position of the response message to remain unreversed if the response message to be sent is a normal response message, and reverses the polarity of the m-bit data unit immediately succeeding the start position of the response message if the response message to be sent is an error response message, and the polarity recognizer recognizes, as a start trigger of the response message, the polarity-reversed data that is detected first in the received communication data, and determines based on the polarity of the m-bit data unit immediately succeeding the first detected polarity-reversed data whether the response message is a normal response indicative of normal transmission of the data or an error response indicative of transmission error.

7. A communication system for communicating data, comprising:

a transmitting device including a coder for encoding data of a primary signal to generate encoded data such that polarity of the encoded data alternates between positive and negative polarities, a head tinning assigner for assigning, to the encoded data, head tinning indicative of beginning of the encoded data, a polarity processor for performing a process on k data units succeeding the head tinning such that polarities of the k data units are individually reversed or left unreversed, and a transmitter for transmitting, as communication data, the encoded data to which the head tinning has been assigned and of which the polarity has been processed by the polarity processor; and a receiving device including a receiver for receiving the communication data, a head tinning detector for detecting the head tinning from the communication data, and a polarity reversal/non-reversal detector for determining whether or not the polarities of the k data units succeeding the head tinning alternate between positive and negative polarities, detecting the polarity different from an expected polarity as a polarity reversal value and the polarity identical with an expected polarity as a polarity non-reversal value, and treating polarity data constituted by at least one of the polarity reversal and non-reversal values as control information.

8. The communication system according to claim 7, wherein the encoded data is assembled into packets, the head timing assigner assigns the head timing to each of the packets, the polarity processor performs a polarity process on a desired number of data units succeeding the head timing of each of the packets so that different packets may include respective control information corresponding thereto, and the polarity reversal/non-reversal detector acquires, as the control information on the respective packets, the polarity data that varies from packet to packet.

* * * * *